V. BENDIX.
CLUTCH.
APPLICATION FILED DEC. 3, 1919.
1,425,360.
Patented Aug. 8, 1922.
2 SHEETS—SHEET 1.
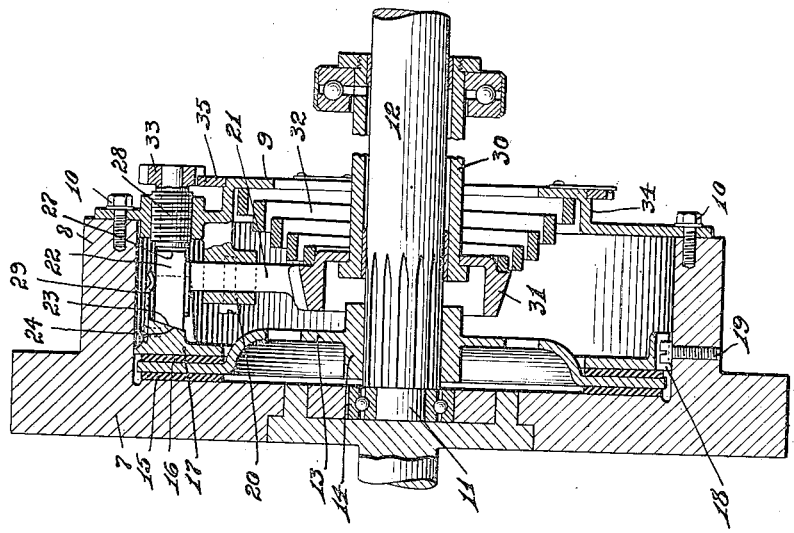
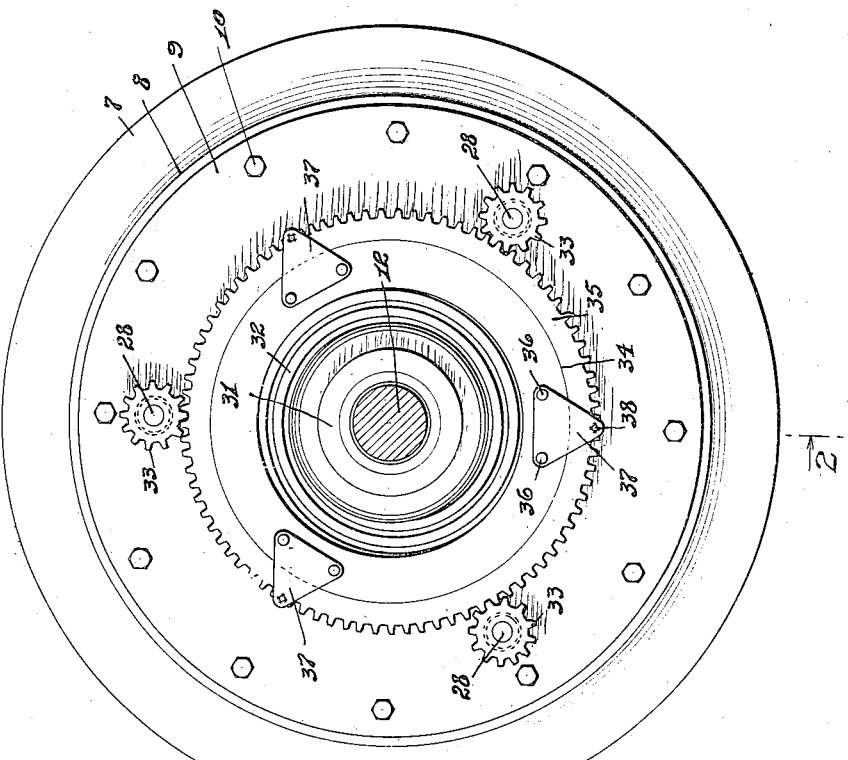
Witness
Martin H. Olsen.
Inventor
Vincent Bendix
By George J. Oltsch
Atty.

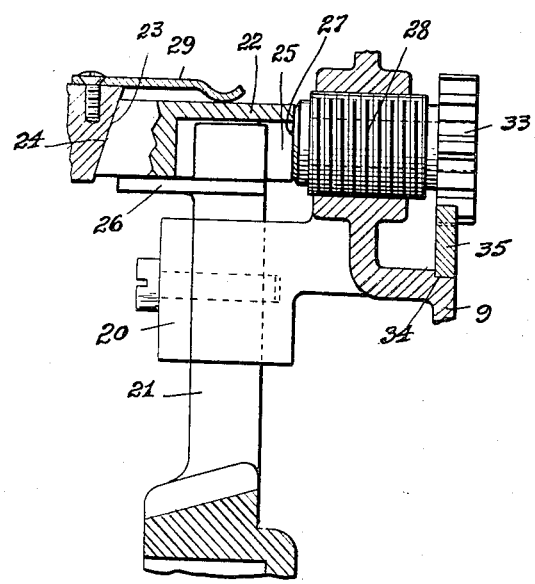
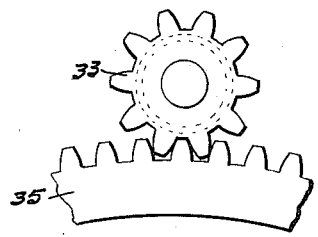
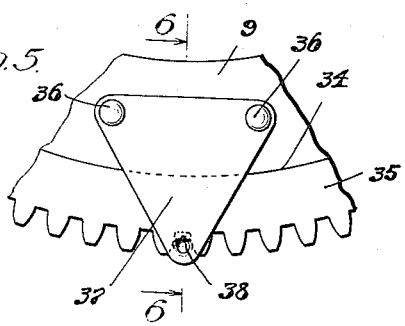
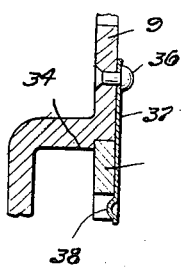

UNITED STATES PATENT OFFICE.

VINCENT BENDIX, OF CHICAGO, ILLINOIS, ASSIGNOR TO BENDIX ENGINEERING WORKS, INC., OF CHICAGO, ILLINOIS.

CLUTCH.

1,425,360.      Specification of Letters Patent.      Patented Aug. 8, 1922.

Application filed December 3, 1919. Serial No. 342,173.

*To all whom it may concern:*

Be it known that I, VINCENT BENDIX, a citizen of the United States, residing at Chicago, in the county of Cook and State of Illinois, have invented certain new and useful Improvements in Clutches, of which the following is a specification.

The invention relates to clutches, and more particularly to a clutch adapted for use in connection with the power transmission of an automobile.

The object of the invention resides primarily in the provision of means for bringing the friction grip elements of the clutch into frictional engagement, consisting of parts having tapered or beveled contact surfaces sliding one upon another, and acting to impart movement from one part to another in a manner to exert great pressure against the clutching elements through the wedging action of the parts. A further object resides in the provision of a friction clutch which is of simple structure, positive in operation, and in which the parts operating to bring the clutching elements into frictional engagement have a relatively wide range of effective movement, whereby the extent of such movement will be sufficient to compensate for considerable wear of said elements before adjustment becomes necessary.

The invention in its preferred form of details will be described in the following specification, reference being had particularly to the accompanying drawings, in which:—

Figure 1 is an end elevation of a clutch embodying the invention.

Figure 2 is a sectional view taken on the line 2—2 of Fig. 1.

Figure 3 is a fragmentary view, partly in section, showing the means for bringing the clutching elements into operative engagement.

Figure 4 is a detail view of the clutch adjusting means.

Figure 5 is a view in elevation of the locking means for the clutch adjusting means.

Figure 6 is a section taken on the line 6—6 of Fig. 5.

The improved clutch is preferably shown as applied to the fly-wheel of an automobile engine, the reference numeral 7 designating such fly-wheel, which is preferably formed with a wide annular flange 8, to provide ample space within the same to house the clutch parts, an end plate 9 suitable bolted to the flange, as at 10, in part forming a closure to complete the housing, and also serving as a support or mounting for the clutch adjusting means, as will presently appear.

Suitably journaled in the fly-wheel, as at 11, is one end of a driven shaft 12, which is adapted to be held against rotation independent of the fly-wheel through intermediary friction grip elements. One of said elements consists of a disk 13, provided with a hub 14 suitably splined to the shaft 12 to permit the same to shift longitudinally of said shaft, but held against rotation independent thereof. Interposed between the marginal edge of the disk 13 and the inner face of the fly-wheel is a friction ring 15, which may be of fibroid or any other suitable material, and adapted to bear against the opposite face of the disk is a like friction ring 16. It will be apparent that, upon the application of sufficient pressure against the friction ring 16, the disk 13 will be frictionally held and caused to rotate with the fly-wheel, and through the said disk the shaft 12 will be caused to rotate in unison with the fly-wheel, all as in the manner well understood in the art.

Adapted to bear against the friction ring 16 is a thrust ring 17, having a peripheral transverse slot or groove 18, into which extends the head end of a bolt 19 threaded into the fly-wheel flange, as in the manner shown, whereby the thrust ring is held against rotation independently of the fly-wheel, but free to shift toward and from the disk 13. Slidably supported, as by a bracket 20, for endwise movement radially of the axis of the clutch, is a bar 21, carrying a cross head 22 on its outer end provided with a beveled end 23 adapted for sliding contact with a similarly beveled portion 24 on the thrust ring 17, whereby outward movement of the cross head will act to move the thrust ring in the direction of and bring the clutching elements into frictional engagement. Conversely, an inward movement of the cross head, when free to act, will release the pressure on the clutching elements and permit the fly-wheel to rotate without imparting a like movement to the shaft 12. The cross head 22 is provided with a recess 25 for the reception of the end of the bar 21, and which latter is provided with a ledge 26 upon which the cross head bears and is slidable endwise thereon for adjustment with relation to the bar 21. The outer end 27 of the cross head is adapted to have a sliding engagement with a normally fixed member, hereinafter referred to as a screw-plug 28, which serves to hold the cross head in proper position to effect a wedging action against the thrust ring 17 in the outer movement thereof, and a spring 29 bearing upon the cross head causes the same to follow its supporting bar 21 in the retraction of the latter. As the clutching elements become worn thin, adjustment of the cross head with relation to said elements becomes necessary after a time, and this is accomplished by screwing the screw-plug 28 inwardly of the clutch to shift the cross head to an effective operative position with relation to said elements. Such adjustment, however, will not be frequently required, owing to the actuating parts for the clutching elements having a considerable range of effective movement, as will be obvious. Mounted upon the shaft 12 for endwise movement thereon is a sleeve 30, carrying a cone faced member 31, upon which the inner beveled end of the bar 21 rests, a helical spring 32, interposed between said cone member and the end plate 9, being tensioned to exert great pressure against the cone member, which in turn imparts endwise movement and pressure to the bar 21, which through its cross head causes the clutching elements to be held in frictional engagement, and the fly-wheel and shaft 12 to be rotated in unison. An outward shifting of the sleeve 30 will allow an inward movement of the bar 21 and its cross head, and release the clutching elements from frictional engagement. In actual practice a foot lever may be employed for shifting the sleeve 30, such not being shown, as any suitable means may be employed for the purpose.

While the drawings disclose but a single bar 21 and cross head 22 for the purposes above described, in actual practice three such are preferably used, same being positioned in equal degrees of angle from each other, corresponding with the like disposition of the screw-plugs 28, as indicated in Fig. 1. Said screw plugs are threaded through the end plate 9, and, as before noted, serve as an adjustable abutment for the cross heads 22, and thus constitute clutch adjusting means. The screw-plugs are formed on their outer ends with a pinion 33, and rotatively mounted on an annular shoulder 34 on the end plate 9, is a ring gear 35, which meshes with each of said pinions, and by the manipulation of which ring gear the screw-plugs may be uniformly and simultaneously turned for the endwise adjustment thereof. Secured to the end plate 9, as by means of rivets 36, are snap springs 37, which extend across the ring gear and serve to hold the same to place, and which springs are formed inwardly of their free ends with a rounded projection or bead 38 adapted to ride over the teeth of the ring gear in the movement thereof, and to lodge between the gear teeth to automatically lock the ring gear against accidental movement.

While the foregoing is the preferred form of my invention, it is to be understood that I do not limit myself to the precise structure shown and described, as it is obvious that the same may be variously modified without departing from the spirit of the invention.

Having thus described my invention, what is claimed is:—

1. A clutch comprising cooperating friction clutching members, and pressure means including radially endwise shiftable elements carrying transversely shiftable cross heads having an angular surface slidably engaging angular surfaces on one of said members for imparting thrust to said member to effect a clutching engagement between said members.

2. A clutch comprising cooperating friction clutching members, radially endwise shiftable elements carrying transversely shiftable cross heads having an angular surface in sliding contact with angular surfaces on one of said members for imparting thrust movement to the latter, and a shiftable bevel faced member having sliding contact with the inner ends of said elements for shifting the same.

3. A clutch comprising cooperating friction clutching members, radially endwise shiftable elements carrying transversely shiftable cross heads having an angular surface in sliding contact with angular surfaces on one of said members for imparting thrust movement to the latter, a shiftable bevel faced member having sliding contact with the inner ends of said elements for shifting the same, and means for retracting said member and elements to release the clutching members.

4. A clutch comprising cooperating friction clutching members, radially endwise shiftable elements carrying transversely shiftable cross heads having an angular surface in sliding contact with angular surfaces on one of said members for imparting thrust movement to the later, a spring pressed bevel faced member having sliding contact with the inner ends of said elements for shifting the same, and a spring bearing against the outer end of each element adapted to retract the same upon retraction of the bevel faced member.

5. A clutch comprising cooperating friction clutching members, radially endwise shiftable bars carrying transversely shiftable cross heads beveled at one end for sliding contact with the beveled surface of one of said members to impart thrust movement to said members, means for shifting said bars, and means constituting adjustable abutments for slidably supporting the cross heads against endwise movement when acting to force the clutching members into operative relation.

In testimony whereof I affix my signature.

VINCENT BENDIX.